Oct. 24, 1967　　H. W. TONEY ETAL　　3,348,441
APPARATUS FOR CUTTING BILLETS BY MEANS OF APERTURED DIES
Filed March 27, 1964　　2 Sheets-Sheet 2
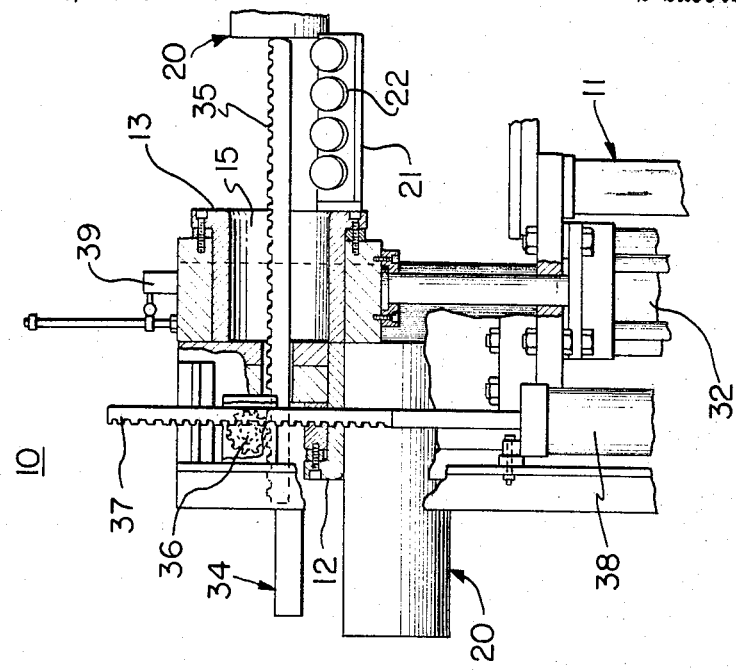
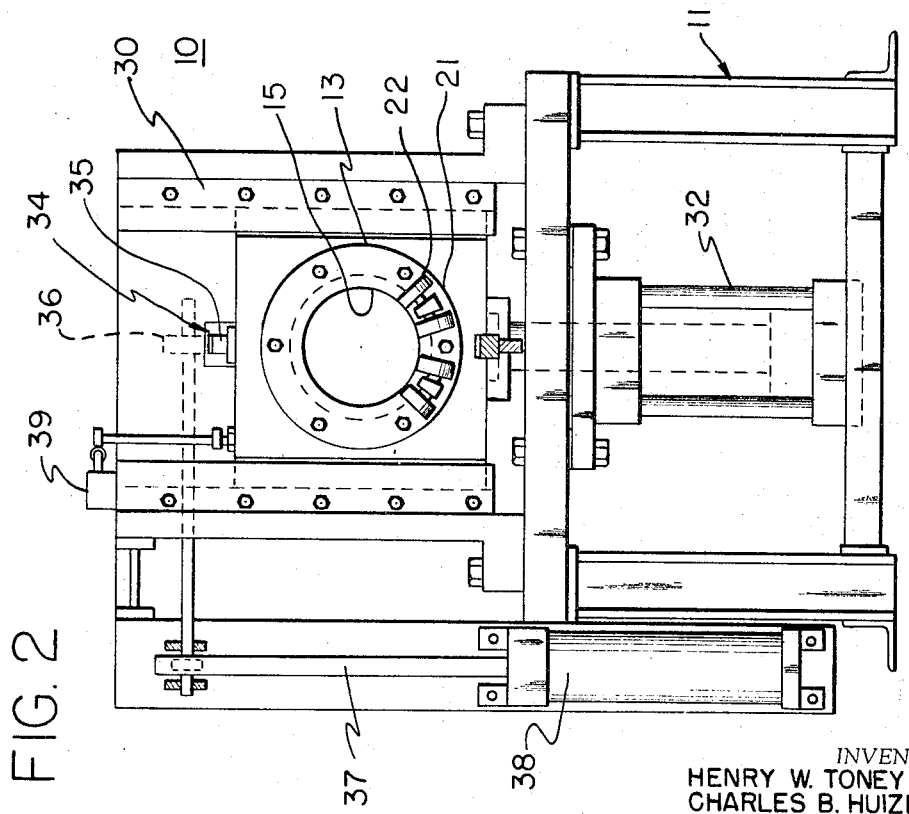
INVENTORS.
HENRY W. TONEY
CHARLES B. HUIZENGA
BY
ATTORNEYS 3,348,441
APPARATUS FOR CUTTING BILLETS BY MEANS
OF APERTURED DIES
Henry W. Toney and Charles B. Huizenga, Niles, Mich.,
assignors to American Metal Climax, Inc., New York,
N.Y., a corporation of New York
Filed Mar. 27, 1964, Ser. No. 355,157
1 Claim. (Cl. 83—123)

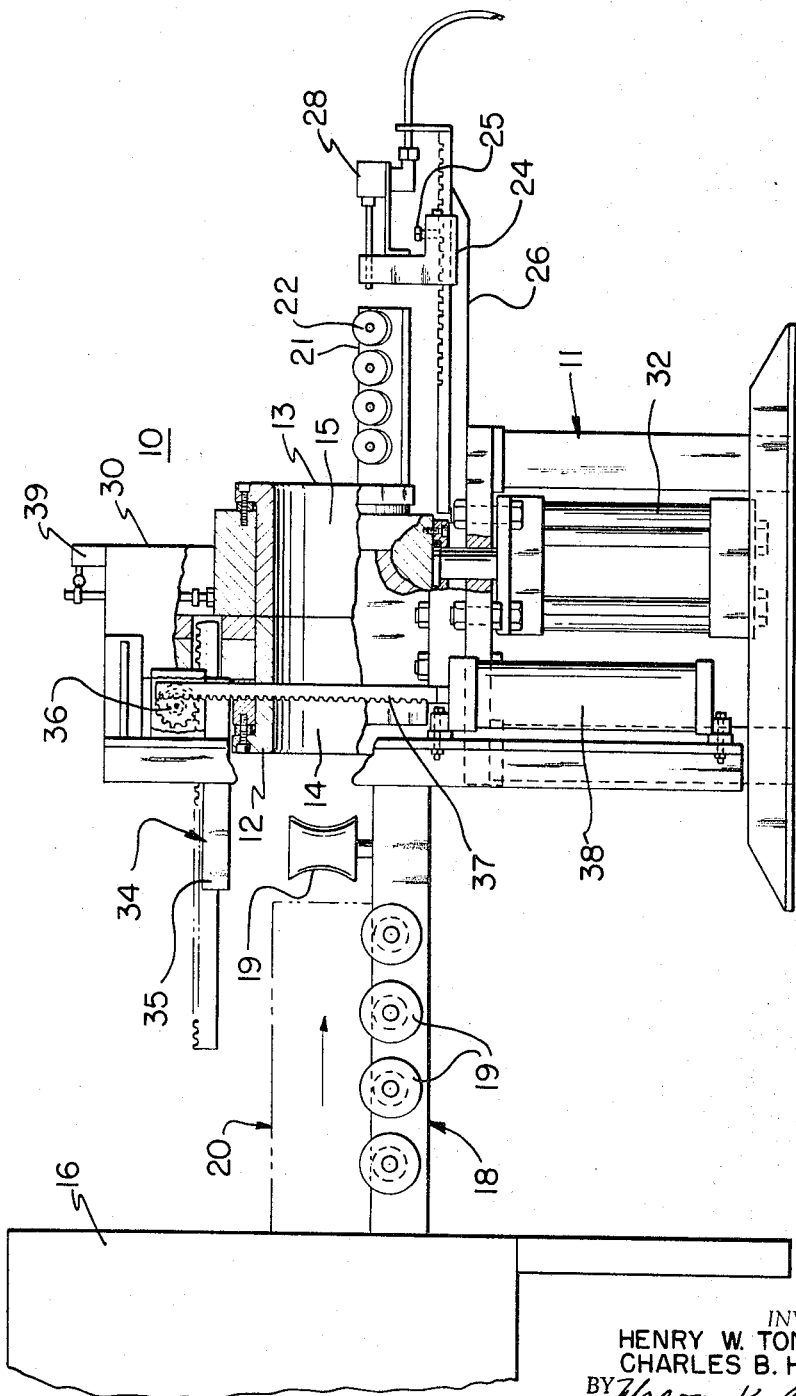

The present invention relates to a billet cutting method and apparatus, and more particularly, to a shearing apparatus for severing aluminum and like billet to a predetermined length, and to a method of shearing the billet.

One conventional commercial method of cutting aluminum billet and the like to a length suitable for extruding and other operations generally comprises placing the cast billet, in a length of approximately 12 feet or longer, on conveyor rolls in front of a power hack, band, or circular saw, and feeding the billet through the saw to an adjustable stop. The billet is then cut to the desired length with the saw. The cut billets are then conveyed from the saw through a gas-fired or induction-heating chamber where they are heated to suitable temperature for further processing. In the case of aluminum to be extruded, the cut aluminum billets will be heated to the range of about 900 degrees F. From the furnace the billets are conveyed to the billet loading table at the extrusion press, where they are released one at a time as needed to a mechanically-operated billet loader that places the heated billet in front of the extrusion ram of the extrusion press. The extrusion ram pushes the billet into the chamber of the extrusion press and through the die to produce a mold conforming to the opening in the extrusion die. The maintenance on the saw, including frequent replacement of saw blades, is quite expensive and, additionally, is comparatively slow. Moreover, a considerable amount of aluminum sawdust is made by the saw and the sawdust must later be scooped up and placed in containers and sent to the source of the billet caster for recasting into new billets.

Aluminum extruders in their operation attempt to convert as much of the billet to useful extrusion as they possibly can. They do this by using various lengths of billet, determined by the size of the section or sections to be extruded, and, also, the desired net length of the finished extrusion, that is, after stretching, sawing off the pinched ends, and cutting to some predetermined length. As the extrusion dies wear, they require more pounds of aluminum per foot, and in order to make the required finished length, the billet length must be increased. Many times a short length billet is desirable in breaking through a hollow die. Because of this condition, extruders load their billet feeders with precut billets. This means that the recovery rate is determined on an average requirement condition hours before the billet will be used. One of the large costs in extruding is the metal that is not converted into finished product, so that it becomes quite important competitively to determine the most efficient length just before the extruding operation begins. Moreover, dies may be changed because of unexpected extruding trouble, and a different length of billet may be required at a time when no hot billets of the desired size are available.

Accordingly, it is an object of the present invention to provide a new and improved billet-severing apparatus for severing aluminum billets and the like.

Another object of the present invention is to provide a new and improved billet-severing apparatus which is advantageous over the conventional sawing apparatus for the reasons given above.

Another object of the present invention resides in the provision of a new and improved billet-severing apparatus wherein the cut length of the billet may be determined just before the billet is used.

Yet another object of the present invention is to provide a new and improved billet-severing apparatus wherein there are no saw cuts required in severing the billet to the desired length.

A further object of the present invention is to provide a new and improved billet-cutting apparatus wherein scrap is minimized.

Another object of the present invention is the provision of a new apparatus for severing hot billets.

Further objects and advantages of the present invention will become apparent as the following description proceeds and the features of novelty which characterize the invention will be pointed out with particularity in the claim annexed to and forming a part of this specification.

In accordance with these and other objects, there is provided an improved billet-severing or cutting apparatus for shearing or cutting aluminum billets and the like. The billet shear includes a stationary and movable die, each provided with an aligned aperture of approximately the same size as and conforming to the cross-sectional shape of the billet. The dies are interchangeable so that dies are selectable with apertures of a diameter corresponding to the size of the billet. Moreover, the dies have sufficient length to minimize skew or distortion of the billet through the apertures. Conveyor means are provided for advancing a billet from the preheat furnace into the dies. Moreover, adjustable stop means are provided for limiting the advance of a billet through the dies and for initiating relative movement of the dies. The movable die and a cradle are moved in unison so that the cradle supports the sheared portion of the billet. Once a billet has been severed, means are provided for ejecting the billet from the movable die.

In a preferred embodiment of the invention, relative movement of the die and ejection of the severed portion of the billet is accompished by hydraulic cylinders.

The invention also relates to the method of severing hot aluminum billets and includes the heating of an elongated billet in a preheat furnace to a suitabe working temperature. Thereafter the billet is confined in the die openings of adjacent, relatively movable dies. Movement of the dies is effective to sever the billet. Thereafter the severed portion of the billet is ejected from the dies.

It will be appreciated that in the new process, according to the present invention, the time of decision as to the required length of billet can be made seconds before the billet is used, thus improving the material recovery over known methods. Moreover, the scrap is also reduced because the billet can be purchased in long lengths, in the range of 12 feet, at a lower price per pound. There are no sawcuts and the whole billet can be used immediately rather than being returned to a furnace for heating to working temperature. In a preferred embodiment the disclosed process uses a gas oven to heat the long billets, conveying them into the shear with a variable adjustable length attachment guage to determine the efficient length for extruding. Means are provided for conveying the sheared portion of the billet to the extruding press. The hot billet shear, according to the present invention, results in a minimum deformation of the billet.

Advantageously, the apparatus and process of the present invention provides a lower cost per pound of finished extrusion because of complete flexibility in the billet length just seconds before the extruding process begins. The time and waste of the saw cut is deleted and the cost per pound on whole billets is lower than with cut billets.

For a better understanding of the present invention, reference may be had to the accompanying drawings wherein:

FIGURE 1 is a side elevational view, with portions broken away, of the billet shear according to the present invention.

FIGURE 2 is an end view of the billet shear of FIGURE 1; and

FIGURE 3 is a fragmentary side elevational view of the billet shear of FIGURE 1, illustrated with components in a different operating position.

Referring now to the drawings, there is illustrated in FIGURE 1 a billet shear or severing apparatus 10 according to the present invention. The shear includes a stationary frame 11 upon which the operating components of the shear are mounted. Mounted on the frame 11 is a stationary, interchangeable, tubular-shaped cutting die 12 and a movable interchangeable tubular-shaped cutting die 13, vertically slidable relative to the stationary die 12. The interchangeability of the dies 12, 13 permits a die size for each diameter of billet which will be processed by the shear; for example, in a commercial embodiment of the billet shear, cutting dies are provided for 7" and 9" diameter billets. The dies 12, 13 are provided with respective aligned apertures or openings 14, 15 which are of approximately the same diameter as, and which conform to the cross-sectional shape of, the billet. Moreover, the dies 12 and 13 are sufficiently long so that they completely surround the billet to make a smooth cut with very little distortion, preventing cocking or skewing in the dies. In one commercial embodiment of the shear, the dies were approximately 12" long and completely surrounded the billet to make a smooth cut without distortion. The cutting action of the dies in the instant invention is like a shear, and produces no scrap metal.

To provide for advancing a billet from a preheat furnace, schematically illustrated at 16, to the shear press, there is provided a conveyor 18 which, in a preferred embodiment, includes a plurality of reversible rollers 19. An aluminum billet 20, illustrated in phantom in FIGURE 1, can advance along the conveyor 18 from the furnace 16 through the die openings 14 and 15 and then be suspended on a cradle 21. The cradle 21 includes a plurality of rollers 22 for receiving the billet 20. The billet 20 is advanced along the cradle 21 until it engages an adjustable stop 24, FIGURE 1, the longitudinal position of which is adjustable to predetermine the cut length of a billet and which is fixedly secured in the selected position by a set screw 25 engageable on a rack 26. Associated with the adjustable stop 24 is a limit switch 28 which is engaged by the billet 20 to initiate shearing action of the shear 10.

To provide for relative movement of the dies 12 and 13, the movable die 13 is vertically slideable in a guillotine frame 30 from a lower position, illustrated in FIGURE 1, to an upper position, illustrated in FIGURE 3. The cradle 21 is secured to the movable die 13 to move with the die. Vertical shearing movement of the movable die 13 is accomplished in the illustrated embodiment by a hydraulic cylinder 32, remotely controlled by a servo-valve from a suitable source of hydraulic power, such as that taken from the extrusion press, and controlled by the engagement of the billet 20 with the limit switch 28.

To provide for ejection of a cut billet out of the movable die 13, there is provided suitable pusher means 34, here shown as a pusher rack 35, retractable from the die opening 15 as illustrated in FIGURE 1, and projectable through the die opening 15 for the length of the cradle 21, as illustrated in FIGURE 3, to push a severed portion of a billet 20 off the end of the cradle 21. As therein illustrated, movement of the rack 35 is provided through a gear and pinion assembly 36 which, in turn, is rotated by a rack 37 forming the piston rod of a hydraulic ejecting cylinder 38. The ejecting cylinder 38 is actuated by a servo-valve controlled by a limit switch 39 which senses the upper position of the movable die 13 as illustrated in FIGURE 3.

From the above description, the operation of the improved billet cutter is believed clear. However, briefly, it will be understood that a plurality of long billets are placed in a gas-fired furnace 16 having a built-in conveyor system and thermostatically controlled. The operator of the extrusion press, by means of suitable control on a control panel, can bring a heated billet from the furnace along the conveyor 18 and through the die openings 14 and 15 to the adjustable stop 24 which has the limit switch 28 secured thereto. The limit switch 28 then actuates the main hydraulic cylinder 32 through suitable servo-valve mechanism causing the sliding movable die 13 to travel upwardly, shearing off the billet 20 at the preselected length. Hydraulic energy is supplied to the shear press from any suitable source, such as from the extrusion press. When the movable die 13 reaches its upper position, it actuates the limit switch 39 at the end of its stroke, causing the pusher means 38 to push the sheared billet out of the die to suitable transfer means (not shown) which transfers the sheared billet to the billet-loaded table of the extrusion press. The servo-valve control mechanism is now effective to reverse the loading on the ejection cylinder 38 and return the pushout or ejector rack 35 to its normal position. The movable die 13 returns down to line up with the stationary die 12. The billet 20 again passes through the shearing dies 12 and 13 to the adjustable stop 24 to repeat the cycle.

When a billet coming from the furnace gets too short for the furnace conveyor system to handle, the reversible power-driven pinch rolls 19 between the furnace and the billet cutter are operable to convey the remainder of the billet through the billet cutter. If there is any down time on the extrusion press, the operator, by means of suitable controls, can reverse the rotation of the pinch rolls 19 causing the billet to return to the furnace 16 in order to hold its temperature until the extrusion press is again ready to go. The final cut, depending on the length of billet being cut, may result in a short leftover section in the stationary die. If so, the piece left over may be pushed out and cast into a container for later recasting into new billets along with the butts accumulated at the extrusion press. However, it has been found that the leftover piece in the shear press may be fully used, if more than a few inches long, merely by butting the succeeding billet against the leftover piece, and having the new billet and leftover piece advanced together against the stop 24. The leftover end piece along with the severed portion of the new billet are then passed to the extrusion press as a single billet and pushed through the extrusion die.

By use of the present billet cutter, the shearing of the billet is accomplished in a few seconds by the operator of the extrusion press and the operating and maintenance costs are small as compared to the sawing method heretofore commercially used and which required an extra man to operate.

It will also be understood that, advantageously, a billet may be heated to the desired working temperature prior to the shearing of the billet.

According to the present invention, the improved method of severing a billet involves the steps of first heating an elongated billet, for example, in the area of 12 feet long, to suitable working temperature. Thereafter, the billet is conveyed through the billet shear where the billet is confined within the die openings of the stationary and movable dies 12 and 13. The die openings closely conform to the size and shape of the billet and additionally are of sufficient length to prevent skewing or cocking of the billet between the dies. The dies are now moved relative to each other so as to sever the billet at a predetermined length by relative movement of the die. The severed portion of the billet is now ejected from the movable die, as illustrated in FIGURE 3, by a pusher rack 35 to remove the billet from the billet cutter on to a conveyor (not shown) which transports the cut portion of the billet into the billet-receiving table of an extrusion press.

The billet is then picked up by the ram of the extrusion press and pushed through the extrusion dies.

Although the present invention has been described by reference to only a single emdbodiment thereof, it will be apparent that numerous other modifications and embodiments may be devised by those skilled in the art, and it is therefore intended by the appended claim to cover all modifications and embodiments which will fall within the true spirit and scope of the present invention.

What is claimed as new and desired to be secured by Letters Patent of the United States is:

A billet severing apparatus for severing aluminum billets and the like and comprising adjacent tubular shaped stationary and vertically slidable movable shear dies, said dies being provided with alignable apertures of approximately the same size as and conforming to the cross-sectional shape of a billet; guillotine means for guiding the vertical movement of said movable die; conveyor means for advancing a billet into the aperture of said fixed die; adjustable stop means for limiting the advance of a billet through the last mentioned aperture, cradle means vertically movable with said movable die positioned for receiving a severed billet discharged from said movable die; hydraulic cylinder means connected for moving said movable die and said cradle means in unison vertically relative to said stationary die with a shear action to sever said billet; limit switch means adjustably positioned with said adjustable stop means for actuating said hydraulic cylinder means; ejection means including a pusher bar for ejecting a severed billet portion from said movable die and said cradle when said movable die and cradle are in their upper position, said pusher bar being provided with a gear rack; pinion means in operative engagement with said gear rack; an ejecting cylinder having a piston rod provided with a gear rack in operative engagement with said pinion means, actuation of said cylinder being effective to operate said pusher bar; and limit switch means controlled by the vertical movement of said movable die for initiating actuation of said cylinder means.

References Cited
UNITED STATES PATENTS

| | | | |
|---|---|---|---|
| 2,740,472 | 4/1956 | Eckstein et al. | 83—198 X |
| 2,784,783 | 3/1957 | West | 83—111 |
| 2,887,155 | 5/1959 | Keefe | 83—15 |
| 2,993,400 | 7/1961 | Glenton et al. | 83—15 |
| 3,039,344 | 6/1962 | Hercik | 83—372 X |
| 3,079,823 | 3/1963 | Ekstrom | 83—111 |
| 3,066,566 | 12/1962 | Bottenhorn | 83—639 X |

ANDREW R. JUHASZ, *Primary Examiner.*

H. C. BOURNE, JR., *Examiner.*

J. B. McGUIRE, *Assistant Examiner.*